(12) United States Patent
Peters et al.

(10) Patent No.: US 7,149,834 B2
(45) Date of Patent: *Dec. 12, 2006

(54) WIRELESS DEVICE ATTACHMENT AND DETACHMENT SYSTEM, APPARATUS AND METHOD

(75) Inventors: Daniel Paul Peters, Carlsbad, CA (US); Stephan Walter Gehring, Menlo Park, CA (US); Jason Lee Ellis, San Diego, CA (US); Satish Ananthakrishnan, San Diego, CA (US)

(73) Assignee: General Atomics, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/100,763

(22) Filed: Apr. 6, 2005

(65) Prior Publication Data

US 2005/0177669 A1  Aug. 11, 2005

Related U.S. Application Data

(63) Continuation of application No. 10/216,671, filed on Aug. 9, 2002, now Pat. No. 6,898,652.

(60) Provisional application No. 60/314,524, filed on Aug. 22, 2001.

(51) Int. Cl.
*G06F 13/10* (2006.01)
*H04L 12/42* (2006.01)
*H05K 7/10* (2006.01)

(52) U.S. Cl. .................. 710/300; 710/46; 710/109; 370/449

(58) Field of Classification Search ........ 710/300–304, 710/15, 19, 46, 105, 62, 106; 370/310, 346, 370/449, 420, 431, 465; 455/73, 560; 340/10.2, 340/3.51; 709/200; 713/1
See application file for complete search history.

(56) References Cited

U.S. PATENT DOCUMENTS 6,185,438 B1  2/2001  Fox
(Continued)

FOREIGN PATENT DOCUMENTS

FR  2 799 288 A1  4/2001
(Continued)

OTHER PUBLICATIONS

"Communication protocol for virtual cellular network (VCN)" by Kim et al. (abstract only) Publication Date: Sep. 27-29, 1995.*

(Continued)

*Primary Examiner*—Gopal C. Ray
(74) *Attorney, Agent, or Firm*—Fitch, Even, Tabin & Flannery; Scott J. Menghini

(57) ABSTRACT

A polling method, apparatus, and system to detect the attachment and detachment of Universal Serial Bus devices in a wireless system. A hub provides a wired connection to the host and wireless attachment points for its devices, The host periodically queries the hub for changes in the hub's status register by sending a polling message through each of its wireless ports, and awaits a response. A peripheral device that wishes to attach to the system responds by sending its unique peripheral address. If a device currently occupies the port, the hub sends out the device's unique address in the polling message. If the device is still present, it responds by sending its unique peripheral address. If a response is not received after multiple retries, the device is considered detached. The hub thus determines the status of the ports and updates the status register, which is queried by the host.

26 Claims, 17 Drawing Sheets

U.S. PATENT DOCUMENTS

| | | | |
|---|---|---|---|
| 6,195,712 | B1 | 2/2001 | Pawlowski et al. |
| 6,529,119 | B1 | 3/2003 | Kumar et al. |
| 6,603,744 | B1* | 8/2003 | Mizutani et al. ............ 370/310 |
| 6,640,268 | B1 | 10/2003 | Kumar |
| 6,650,549 | B1* | 11/2003 | Chiao ......................... 361/785 |
| 6,725,302 | B1* | 4/2004 | Benayoun et al. ............ 710/62 |
| 6,898,652 | B1* | 5/2005 | Peters et al. ................ 710/300 |
| 6,912,651 | B1* | 6/2005 | Hamdi et al. .................. 713/1 |
| 6,956,844 | B1* | 10/2005 | Dlugos et al. .............. 370/352 |
| 2003/0048905 | A1 | 3/2003 | Gehring et al. |
| 2003/0086388 | A1* | 5/2003 | Peters et al. ................ 370/328 |
| 2005/0177669 | A1* | 8/2005 | Peters et al. ................ 710/300 |

FOREIGN PATENT DOCUMENTS

| | | |
|---|---|---|
| WO | WO 01/11476 A1 | 2/2001 |
| WO | WO 01/56179 A1 | 8/2001 |

OTHER PUBLICATIONS

A.S. Tanenbaum, "*Computer Networks*," Third Edition, chapter 4, pp. 243-335, Prentice Hall, 1996.

Compaq Computer Corporation, et al.; *Universal Serial Bus Specification Revision 2.0*; Apr. 27, 2000; pp. 19-20, 24, 195-208, 239-249; USB Implementers Forum, Inc.

European Telecommunications Standards Institute (ETSI); *EN 300 652 V1.2.1 "Broadband Radio Access Networks (BRAN); High Performance Radio Local Area Network (HIPERLAN) Type 1; Functional Specification*;" vol. 1.2.1; Jul. 1998; pp. 15-20, 28-34, 37-40, 46-52, 63-79; ETSI.

European Telecommunications Standards Institute (ETSI); *ETSI Technical Report, ETR 133, "Radio Equipment and Systems (RES); High Performance Radio Local Area Network (HIPERLAN); System Definition*;" Jul. 1994; pp. 9-25; ETSI.

European Telecommunications Standards Institute (ETSI); *ETSI TS 101 761-1 V1.1.1; "Broadband Radio Access Networks (BRAN); HIPERLAN Type 2; Data Link Control (DLC) Layer Part 1: Basic Data Transport Functions*;" vol. 1.1.1; Apr. 2000; pp. 12-14, 47-62; ETSI.

European Telecommunications Standards Institute (ETSI); *ETSI TS 101 761-2 V1.1.1; "Broadband Radio Access Networks (BRAN); HIPERLAN Type 2; Data Link Control (DLC) Layer; Part 2: Radio Link Control (RLC) sublayer*;" vol. 1.1.1; Apr. 2000; pp. 17-52, 96-101, 109-120; ETSI.

European Telecommunications Standards Institute (ETSI); *ETSI TS 101 761-3 V1.1.1; "Broadband Radio Access Networks (BRAN); HIPERLAN Type 2; Data Link Control (DLC) Layer; Part 3: Profile for Business Environment*;" vol. 1.1.1; Sep. 2000; pp. 7-9; ETSL.

European Telecommunications Standards Institute (ETSI); *ETSI TS 101 761-3 V1.1.1; "Broadband Radio Access Networks (BRAN); HIPERLAN Type 2; Data Link Control (DLC) Layer; Part 4: Extension for Home Environment*;" vol. 1.1.1; Jun. 2000; pp. 13-17, 25-27, 71-80; ETSI.

Institute of Electrical and Electronics Engineers (IEEE); *ISO/IEC 8802-11:1999(E); ANSI/IEEE Std 802.11*; First Edition, 1999; pp. 17-33, 70-116, 136-137; IEEE.

*PCT International Search Report*, European Patent Office (EP/ISA), from corresponding PCT Application No. PCT/US02/26914, mailed Jan. 8, 2003, three pages.

"Remote wireless measuring system" by Gwo-Jia Jong; Te-Jen Su, Chen-Hong Yang; Moir, T.J. (abstract only) Publication Date: Sep. 9-12, 1997.

Telefonaktiebolaget LM Ericsson, et al.; *Specification of the Bluetooth System (Core)*; vol. 1; Version 1.0B; Nov. 29, 1999; pp. 45-46, 95-122, 193-202, 225, 275-286, 296-299, 1042-1061; Bluetooth Special Interest Group (SIG).

Telefonaktiebolaget LM Ericsson, et al.; *Specification of the Bluetooth System (Profiles)*; vol. 2; Version 1.0B; Dec. 1, 1999; pp. 22-51, 170-184; Bluetooth Special Interest Group (SIG).

"Wireless communication of vital signs using the Georgia Tech wearable motherboard" by Firoozbakhsh, B.; Jayant, N.; Park, S.; Jayaraman, S. (abstract only) Publication Date: Jul. 30-Aug. 2, 2000.

* cited by examiner

500
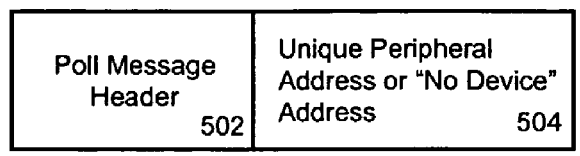
FIG. 5
600
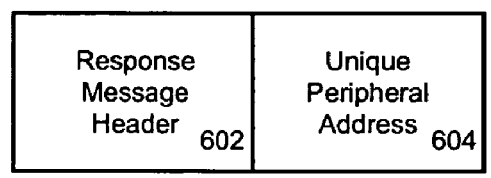
FIG. 6

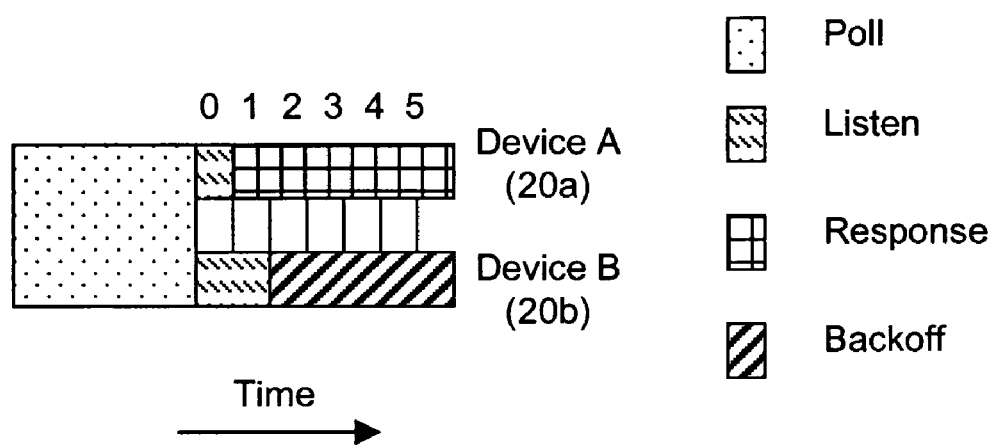
FIG. 10

| Current State | Current Addr | Poll | Response | Retries | Host Action | New State |
|---|---|---|---|---|---|---|
| Detached | NoDevice | Poll (NoDevice) | - | | - | Detached |
| Detached | NoDevice | Poll (NoDevice) | Resp (x) | | Register & Enumerate | Attached |
| Attached | x | Poll (x) | Resp (x) | | - | Attached |
| Attached | x | Poll (x) | - | > 0 | Decrement Retries | Attached |
| Attached | x | Poll (x) | - | = 0 | Deregister & Reset Retries | Detached |

FIG. 11a

| | | Device Attached | | Device Detached | |
|---|---|---|---|---|---|
| Port State | Poll Message | Resp Message | Host Device Action | Resp Message | Host Device Action |
| Detached | Poll /No Dev ID | Resp / ID | Set to ID | None | None |
| Attached | Poll / ID | Resp / ID | None | None | Set to Dev ID |

FIG. 11b

WIRELESS DEVICE ATTACHMENT AND DETACHMENT SYSTEM, APPARATUS AND METHOD

RELATED APPLICATIONS

This application is a continuation of U.S. application Ser. No. 10/216,671, filed Aug. 9, 2002 now U.S. Pat. No. 6,898,652, which claims the benefit of U.S. Provisional Application No. 60/314,524 filed Aug. 22, 2001, both or which are incorporated herein by reference.

BACKGROUND

1. Field of the Invention

Aspects of the present invention relate in general to the field of wireless communications.

2. Background

One common way of attaching peripherals to a computer is via a Universal Serial Bus (USB) interface. One of the most convenient features of USB is the ability to add and remove devices from the bus during normal operation ("hot-plugging"). To achieve this "hot-plugging" feature, the host periodically polls each attached USB hub device to determine the state of each of the hub's active downstream ports. If the hub detects that a device is attached to a port, it enables the port and then enumerates the device. If the hub detects that a previously attached device is detached, the port is disabled. In a wired environment, the hub determines the attachment and detachment of devices by monitoring the differential data lines within the USB cable to detect changes in voltage levels. The hub then sets bits in its status register indicating any changes to its ports. The host subsequently reads the status register on the next poll period. The process of detecting device attachment and detachment by monitoring differential data lines is clearly not feasible in a wireless environment.

Due to the ease of installation and use by consumers, USB interfaces have grown in popularity and are included on many computer peripherals. Despite its benefits, USB suffers from the multitude of cables required to attach peripherals.

BRIEF DESCRIPTION OF THE DRAWINGS

FIG. 5 is a block diagram of a poll message packet data structure, to attach and detach wireless peripheral devices to a host in a wireless system.

FIG. 6 is a block diagram of a response message packet data structure, to attach and detach wireless peripheral devices to a host in a wireless system.

FIG. 10 depicts an example of a collision avoidance scheme to attach and detach wireless peripheral devices.

FIGS. 11A–11B are charts depicting possible state corresponding to ports, to attach and detach wireless peripheral devices to a host in a wireless system.

DETAILED DESCRIPTION

Aspects of the present invention include a system, apparatus and method to attach and detach wireless peripheral devices. In some aspects, wireless networks enable embodiments that are fully compatible with the Universal Serial Bus. Some embodiments enable a wireless host device to detect the attachment of a new wireless peripheral, to detect detachment of a previously attached wireless peripheral, and to monitor continued presence of a previously attached device.

The embodiments of the invention may be independent of any underlying wireless communication technology. It is understood that although the following embodiments are disclosed using a wireless connection to implement a wireless communications framework compatible with Universal Serial Bus, other embodiments using other wireless communications protocols and technology are possible. Examples of alternative wireless communication protocols and technology compatible with embodiments of the present invention include, but are not limited to: ultra-wide-band (UWB), a wireless implementation of Institute of Electrical and Electronics Engineers (IEEE) Standard No. 1394 ('wireless Firewire'), Institute of Electrical and Electronics Engineers (IEEE) Standard Nos. 802.11a, IEEE 802.11b ("Wi-Fi"), IEEE 802.11 g, IEEE 802.15 (WPAN), Bluetooth, and a wireless implementation of the RS-232 protocol. For convenience, embodiments below will now be discussed using the USB protocol.

Figure 1A:
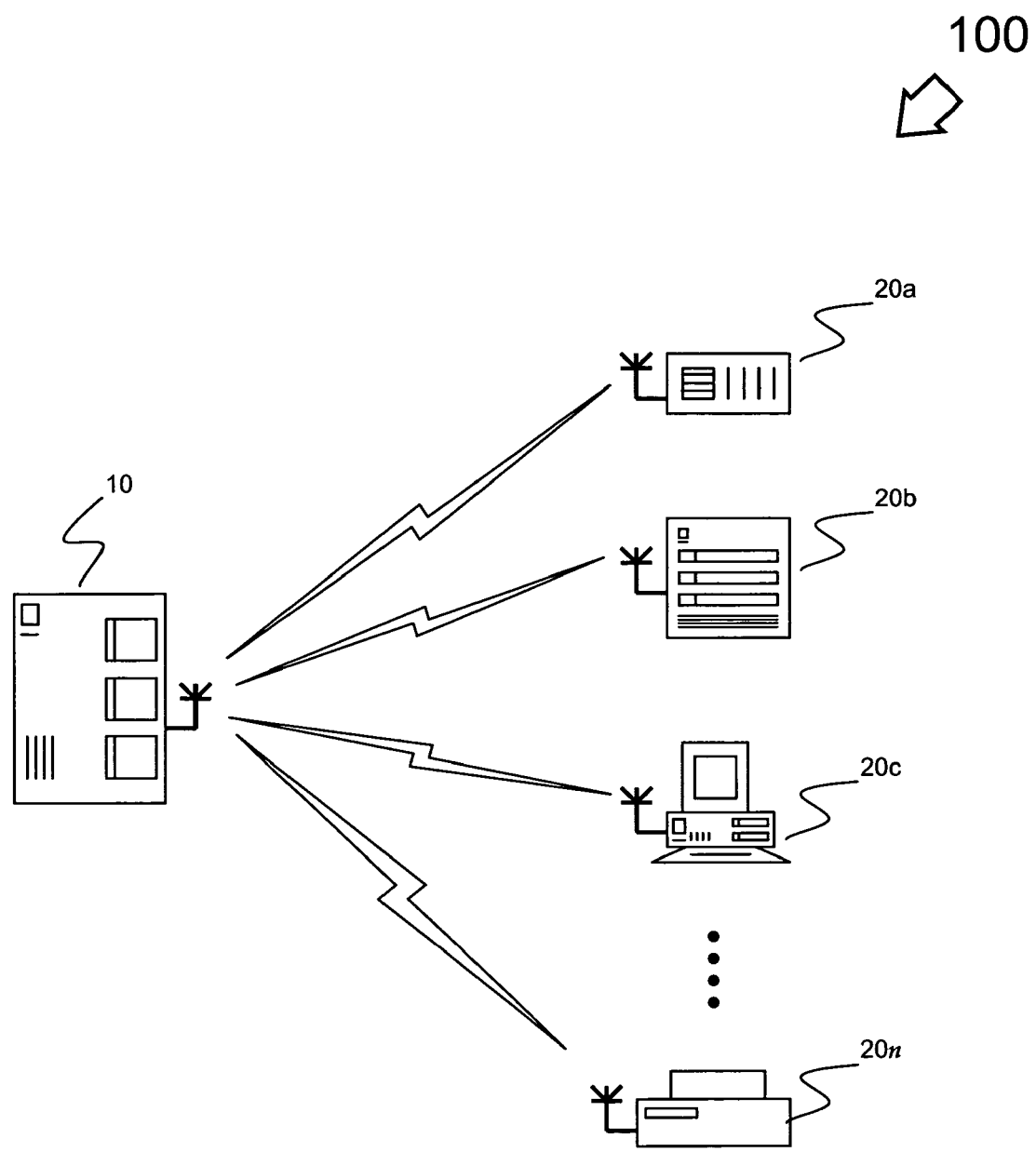
FIGS. 1A and 1B illustrate embodiments of a system to attach and detach wireless peripheral devices to a host in a wireless system.

FIG. 1A is a simplified diagram depicting system 100, constructed and operative in accordance with an embodiment of the present invention. System 100 is configured to attach and detach wireless peripheral devices 20 to a wireless host device 10 in a wireless system.

In some embodiments, wireless peripheral devices 20 are expected to be limited in resources, lacking a man-machine interface for network-related tasks. These network-related tasks include entering peripheral device encryption keys. Also, in many embodiments, wireless peripheral devices 20 may not have a processor available to perform complex communication tasks.

Figure 1B:
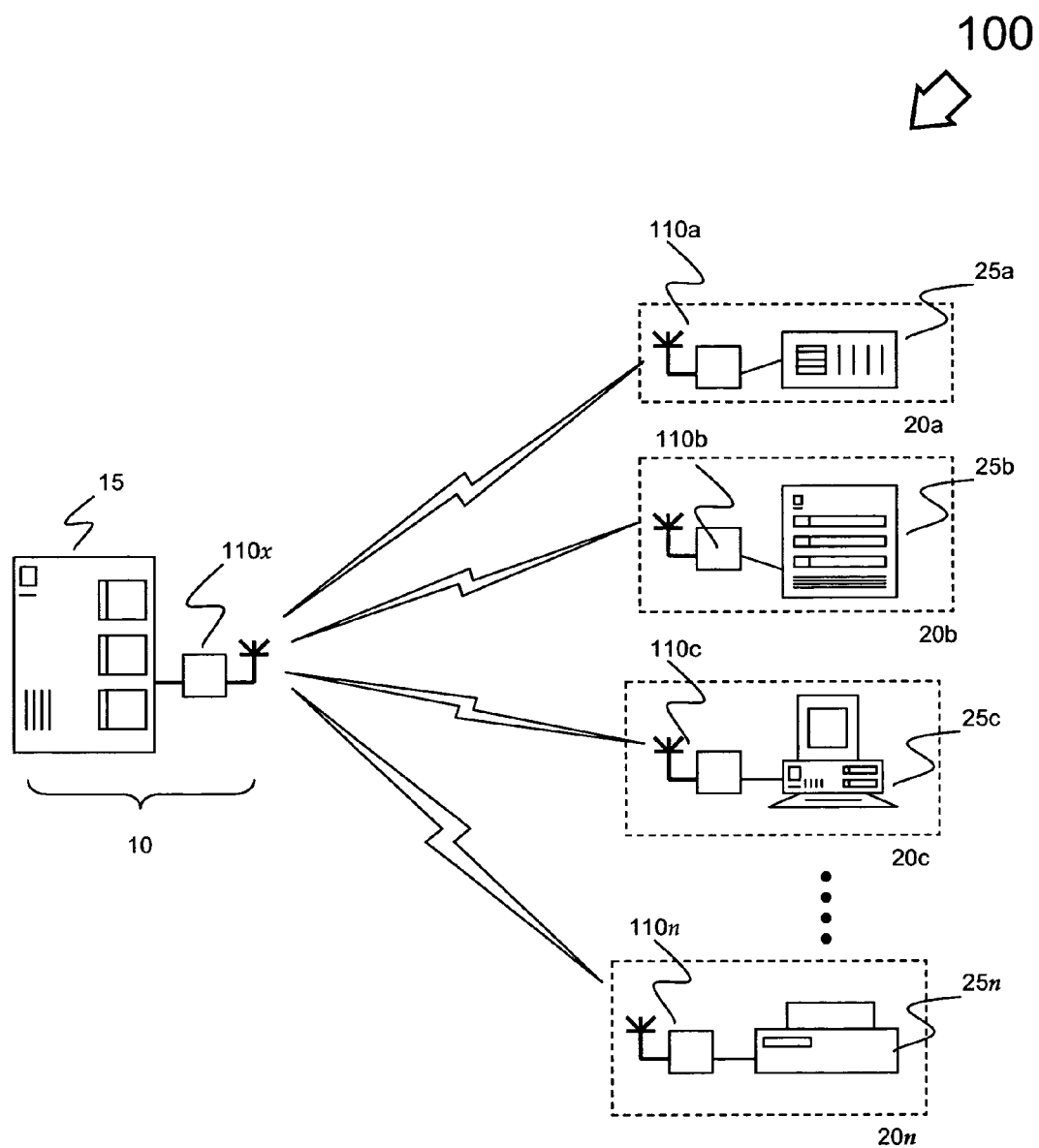

As shown in FIG. 1B, constructed and operative in accordance with an embodiment of the present invention, the wireless devices 10 and 20 depicted in system 100 may comprise host 15 and peripheral devices 25 coupled to wireless modules 110. For example, wireless host device 10 may be further comprised of host 15 and a wireless module 110x.

Wireless modules 110a–x are any devices that allow a conventional computing device to communicate with other wireless modules 110 or wireless devices 10, 20 using a method embodiment of the present invention, as described in the claims below. The host device 15 interacts with the wireless system through wireless module 110x. The wireless module 110x sends data received from the host 15 to wireless peripheral devices 20 and passes on data received from wireless peripheral devices 20 through the system to the host 15.

Figure 2:
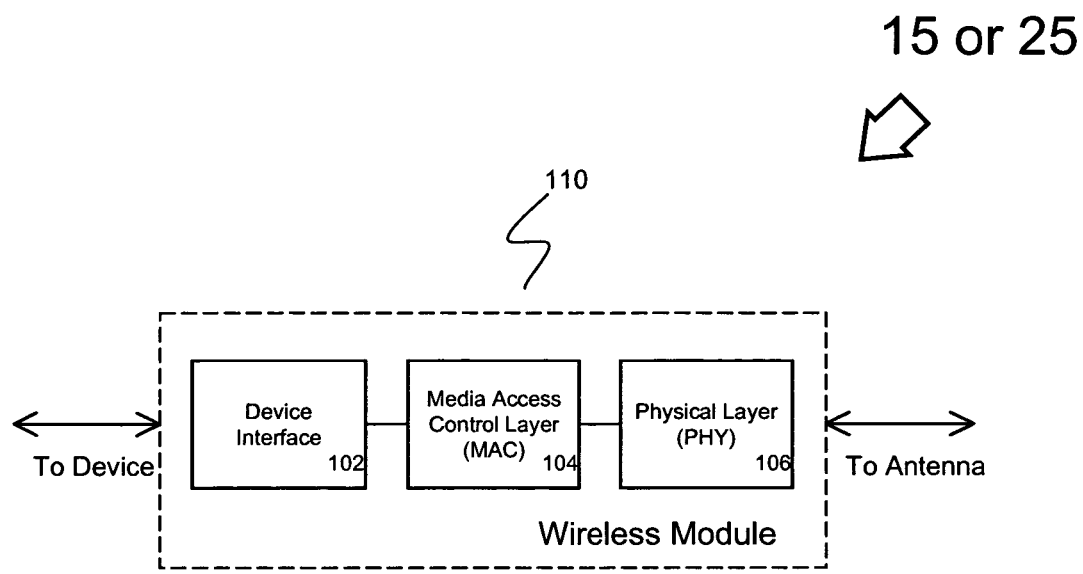
FIG. 2 is a block diagram of a wireless module to attach and detach wireless peripheral devices to a host in a wireless system.

FIG. 2 is a block diagram of wireless module 110, constructed and operative in accordance with an embodiment of the present invention. It is well understood by those knowledgeable in the art that the elements of FIG. 2 may be implemented as structures in hardware, firmware, or as software instructions and data encoded on a computer-readable storage medium. Wireless module 110 comprises device interface 102, media access control layer (MAC) 104 and physical layer (PHY) 106. In some embodiments, wireless module 110 may also include an antenna (not shown), as is known in the art.

Device interface 102 is any interface, as is known in the art, which allows wireless module 110 to interface with host 15 or peripheral device 25. In some embodiments, device interface 102 may emulate a standard communications protocol so that host 15 or peripheral device 25 does not realize that it is communicating with another wireless device. For example, in wireless USB embodiments, device interface 102 may emulate a USB interface.

Media access control layer 104 is any structure that governs access to the wireless transmission media. As shown in FIG. 2, media access control layer 104 is coupled to device interface 102 and physical layer 106, enabling device interface 102 to exchange data with the physical layer 106.

Physical layer 106 is any structure that provides the procedures involved in transferring a single bit over the wireless medium being used by the wireless module 110.

Figure 3:
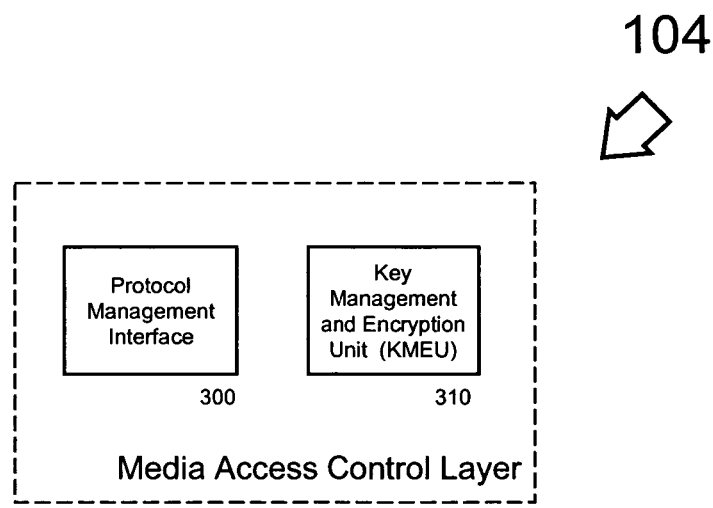
FIG. 3 is a block diagram of a media access control (MAC) layer to attach and detach wireless peripheral devices to a host in a wireless system.

FIG. 3 is a block diagram of a media access control layer 104, constructed and operative in accordance with an embodiment of the present invention. In this embodiment, media access control layer 104 comprises a protocol management interface 300 and a key management and encryption unit (KMEU) 310.

Protocol management interface 300 is the structure that enables media access control layer 104 to communicate using a particular wireless communications protocol, as described above. For example, in a wireless Universal Serial Bus (wireless USB) embodiment, protocol management interface 300 processes messages from device interface 102 and regulates the message access to the physical layer 106 using the Universal Serial Bus protocol.

In a conventional (wired) USB system, a USB port is a physical structure, and a USB host device periodically polls each attached hub device to determine the state of each of the hub's active downstream ports. In a wireless USB embodiment, each port is no longer a physical structure, but a virtual structure to be connected via physical layer 106. In the wireless embodiment, protocol management interface 300 may be the structure that monitors the downstream (virtual) USB ports. In embodiments using different wireless protocols, a corresponding protocol may be implemented in protocol management interface 300.

Key management and encryption unit 310 performs encryption and decryption of messages. As shown in FIG. 3, KMEU 310 may be situated in the MAC layer 104. In some embodiments, however, media access control layer 104 may only comprise protocol management interface 300. In such embodiments, the key management and encryption unit 310 may be located in, or functionally distributed within the wireless module 110, among other parts of the path between devices 15 or 25 and the antenna, or may be omitted entirely. Therefore, the location of the key management and encryption unit 310 should not be viewed as limiting the scope of the embodiments of the present invention, which are limited solely by the claims.

Figure 4:
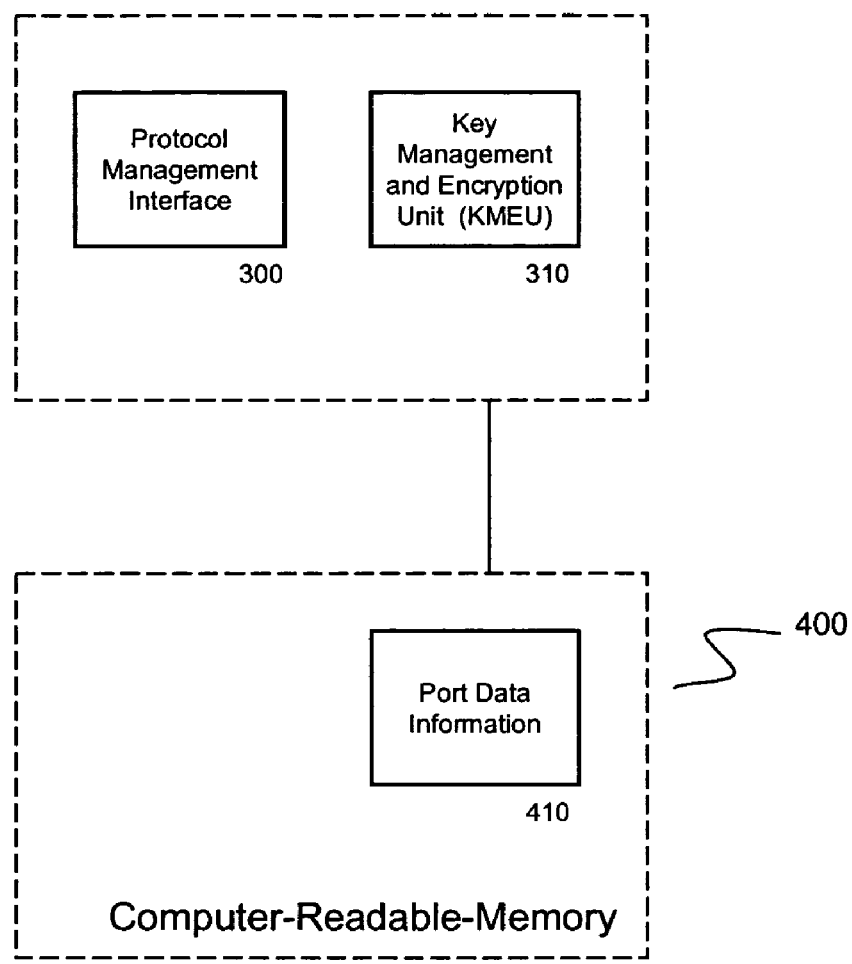
FIG. 4 is a block diagram of an embodiment of a protocol management interface (PMI) to attach and detach wireless peripheral devices.

FIG. 4 is a block diagram of an alternate embodiment of media access control layer 104, constructed and operative in accordance with an embodiment of the present invention. In this embodiment, media access control layer 104 additionally comprises a computer readable medium 400.

Computer readable medium 400 may be any computer-readable memory known in the art. This definition encompasses, but is not limited to: Read Only Memory (ROM), Random Access Memory (RAM), flash memory, Erasable-Programmable Read Only Memory (EPROM), non-volatile random access memory, memory-stick, magnetic disk drive, transistor-based memory or other computer-readable memory devices as is known in the art for storing and retrieving data. An example of such data is port data information 410.

Figure 7A:
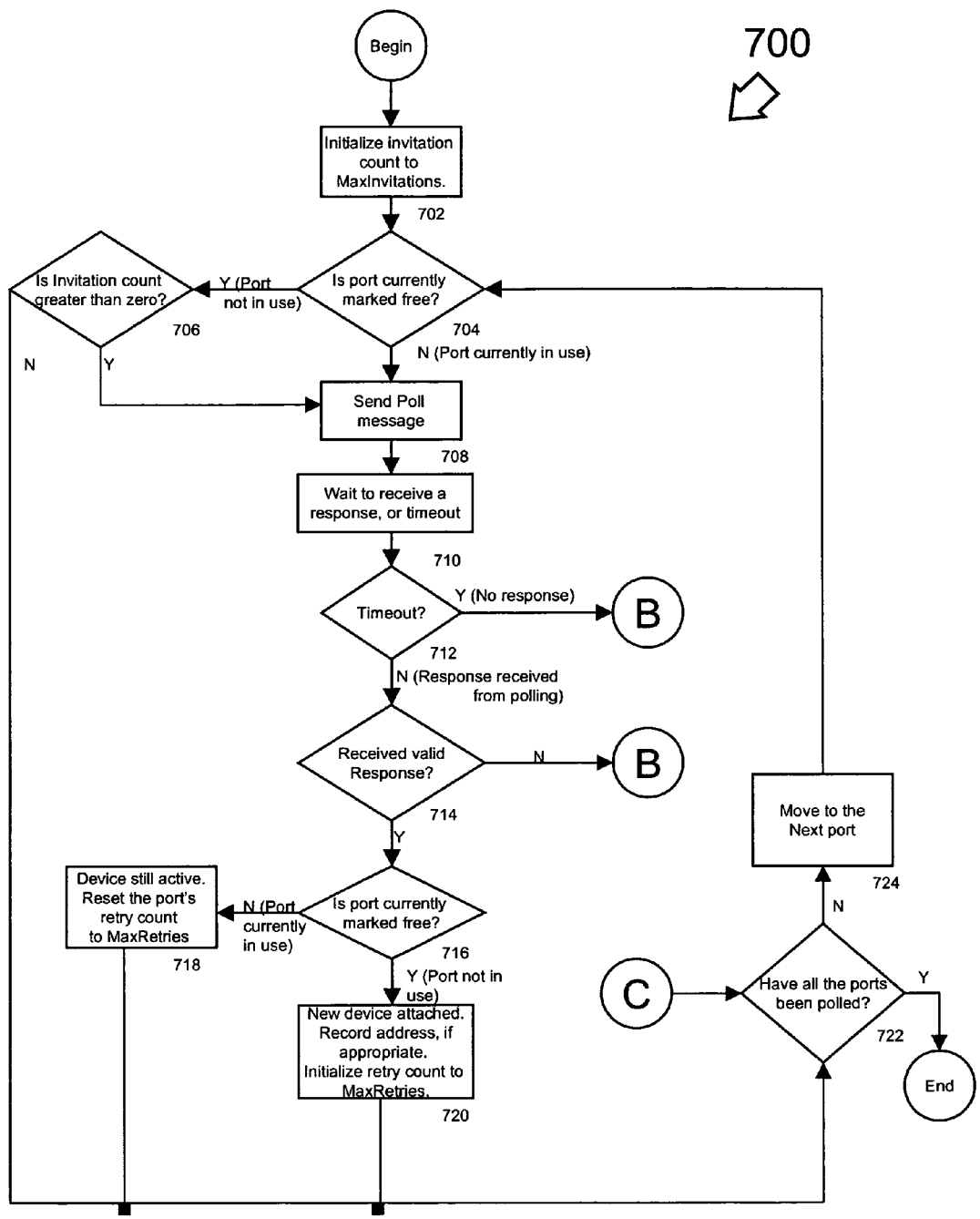
FIGS. 7A–7B are a flowchart of a host method 700, to attach and detach wireless peripheral devices to a host in a wireless system.
Figure 7B:
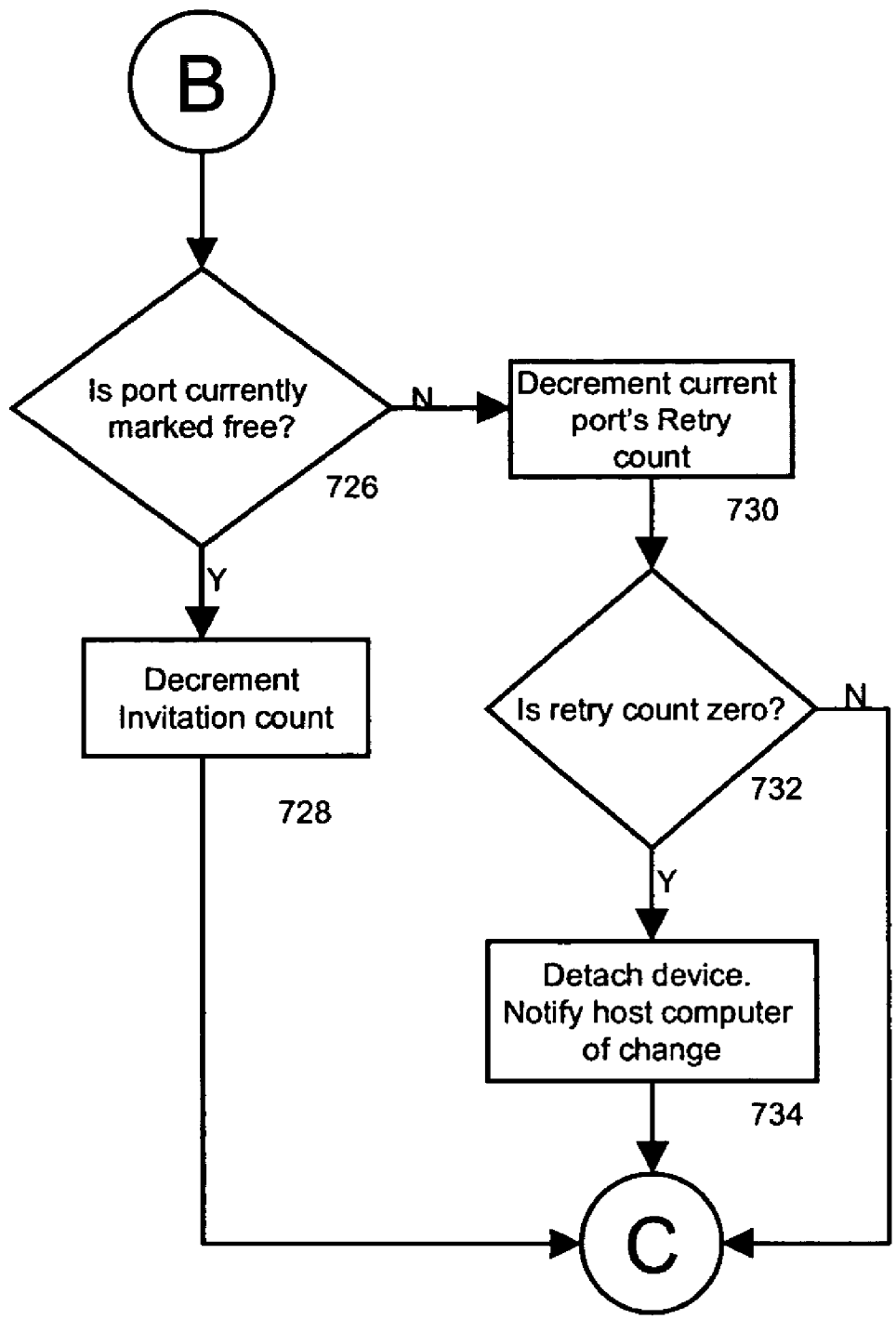

FIGS. 7A–7B are a flowchart of a host process 700, an embodiment to attach and detach a wireless peripheral device 20 to a wireless host device 10 in a wireless system 100, constructed and operative in accordance with an embodiment of the present invention.

To implement the "hot-plugging" feature of wired USB in a wireless scenario, host process 700 uses a polling scheme in which messages are passed over the wireless link, between the host device 10 and the peripheral device 20, in order to determine the state of each port supported by the host device 10. FIGS. 5 and 6 show an exemplary format of these messages, constructed and operative in accordance with an embodiment of the present invention. A poll message 500 comprises a poll message header 502 and a peripheral device address 504. If a peripheral is attached to the port, the peripheral device address 504 contains the unique address of the peripheral device. Otherwise, the peripheral device address 504 contains the "No Device" address. A response message 600 comprises a response message header 602 and a unique peripheral device address 604. During each polling period, a specific poll message 500 is generated by the wireless module 110x for each of the ports that need to be polled. After sending out a poll message 500 through a port, the wireless module 110x awaits a response message 600 from the wireless module 100a–n. Based on the response message 600 received, appropriate action is performed by the wireless module 110x as described below. An embodiment of the various port states and actions performed are shown in FIGS. 11A and 11B, constructed and operative in accordance with an embodiment of the present invention. These states are described in greater detail below.

To retain the state of all downstream ports, the host maintains an internal data structure. This data structure may be any information structure known in the art capable of containing an entry for each port available to the host, including, but not limited to: arrays, linked lists, trees, or database schemas, and the like.

Figure 12:
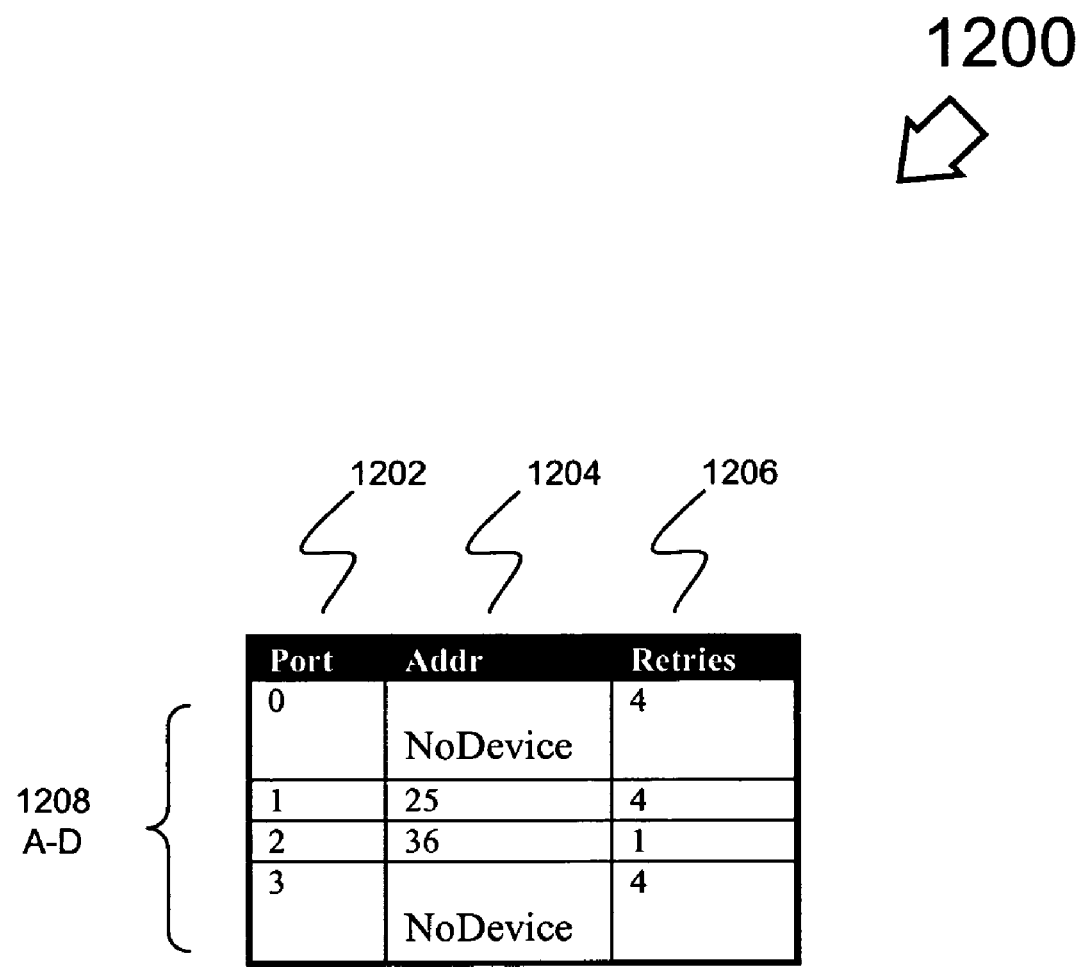
FIG. 12 is an exemplary diagram of port information stored in a memory structure, to attach and detach wireless peripheral devices to a host in a wireless system.

An exemplary port data structure 1200 is shown in FIG. 12, constructed and operative in accordance with an embodiment of the present invention. As shown in FIG. 12, each port 1208A–D is associated with three elements, a port identifier field 1202, an address ("Addr") field 1204, and a retries ("Retries") field 1206.

It is understood, by those of ordinary skill in the art, that the number of ports 1208 shown is for illustrative purposes only, and that the number of ports is not limited by the process 700, but that some embodiments may be limited by their individual implementation. For example, the Universal Serial Bus v. 2.0 specifications limit the number of ports to 127. Consequently, Universal Serial Bus v. 2.0 embodiments may be similarly limited.

Returning to FIG. 12, the address field 1204 corresponds to either a unique peripheral address assigned to the port 1208 indicating an attached device, or a predetermined unique "No Device" address (i.e. the detached state). Note that the unique peripheral address is different from a USB address assigned by USB host software. The retries field 1206 indicates the number of times the host will retransmit a poll message to a peripheral address, in the case where the device fails to respond to its own address. This encompasses situations where either the polling message or the device response is lost during transmission. Upon power-up, the address field 1204 for each port 1208 is set to the "No Device" state, while the retries field 1206 is set to some initial predetermined value. FIG. 12 depicts an example of a host with four ports 1208A–D. Ports 1208B–C are occupied. Port 1208C has been polled three times with no response.

Returning to FIG. 7A, initially, at block 702, the wireless hub module 110x initializes the invitation count to a predefined number. At decision block 704, if the port is currently marked as "free" or "not in use," flow continues at decision block 706. If the port is currently in use, flow continues at block 708.

At decision block 706, if the invitation count is greater than zero, flow continues at block 708. If the invitation count is not greater than zero, no new invitations need to be sent. The hub checks to see if all the ports have been polled at decision block 722. If all the ports have not been polled, then the hub moves onto the next port at block 724, and flow returns to block 704. If all the ports have been polled, as determined at block 722, process 700 ends.

At block 708, the hub sends out a poll message, and awaits a response from the device for a specified amount of time at block 710. If a timeout occurs as determined at block 712, it may either mean that the peripheral is no longer within range, or that the poll message or response message was lost during transmission. The flow then continues at block 726 in FIG. 7B.

If a device is still within range of the hub and functioning, it sends a response message to the hub, with the address field 1204 set to its unique peripheral address. If the hub receives a response before the timeout period as determined at block 712, it checks to make sure that the received response is valid at decision block 714. If the received response is invalid, flow continues at block 726 in FIG. 7B. If a valid response is received, the hub checks to see if the port is currently marked free at decision block 716. If the port is currently marked free, it indicates that the response was received from a newly attaching device. The hub records the address 1204 of the new device and initializes the retries field 1206 of the concerned port to MaxRetries at block 720. Obviously, embodiments that do not use unique peripheral addresses do not record the address at block 720. The hub then checks to see if all the ports have been polled at decision block 722.

If the hub determines that the port is currently in use at block 716, it signifies that the device is still active. The hub resets the retries field 1206 of that port to MaxRetries at block 718. Then, as in the other case, the hub checks to see if all the ports have been polled at decision block 722. If all the ports have not been polled, then the hub moves onto the next port at block 724, and flow returns to block 704. If all the ports have been polled, as determined at block 722, process 700 ends.

Continuing onto FIG. 7B, if the port is currently marked free as determined at block 726, the hub decrements the invitation count, and if all the ports have not been polled as determined at decision block 722, the hub moves onto the next port at block 724, and flow returns to block 704. If all the ports have been polled, process 700 ends. Alternatively, if the port is currently in use as determined by the hub at decision block 726, then the hub decrements the current port's retries field 1206 at block 730, and checks to see if the retries field equates to zero at decision block 732. If the retries field 1206 is zero, it means that the device is now out of range. The hub detaches the device and notifies host 15 of the change, at block 734. Then, the hub checks to see if there are any more ports to be polled at decision block 722. If the retries field 1206 is not zero as determined by decision block 732, the hub does not take any further action. The flow moves on to decision block 722 as before, to determine if there are any more ports to be polled. If there are more ports to be polled as determined at decision block 722, the hub moves to the next port at block 724 and flow returns to block 704. If all the ports have been polled, process 700 ends.

Due to the potential large number of ports, many of which may be unused, numerous unnecessary invitations for newly joining devices could be sent by the host 15. If no response is received to the previous "No Device" polling invitation, it may mean that there is no new device wanting to attach, or that either the invitation or response to the invitation was garbled during transmission. Process 700 accounts for this by maintaining a count of invitation messages sent. If there is no response to a "No Device" polling invitation, the invitation count is decremented, at block 728. Then, the hub checks to see if the invitation count has reached zero, at decision block 706. If the count reaches zero, the host stops sending further invitations during this polling cycle. The count is reinitialized at block 702 during the next round of polling.

A situation may arise where two (or more) devices attempt to connect to the system at the same time. This may happen, for instance, upon power-up, when a number of devices are already within range of the host, and one or more of the devices simultaneously respond to a host invitation. To handle this case, a technique based on time slots may be applied. Each device receiving an invitation to the system waits a random number of time slots (0 . . . n). During the waiting period, it senses the channel to determine whether any other device is transmitting. If so, the device backs off and waits for another invitation from the host. This channel access method probabilistically reduces the number of collisions that can occur during the attachment phase.

An embodiment of a host method 700, implemented in a wireless host module 110x, is shown below. During normal polling by the host computer, the hub cycles through each entry in the data structure depicted in FIG. 12, sending out a poll message with the stored address for each port.

| | Host Method Pseudo-Code Embodiment |
|---|---|
| 1 | sendInvitation = MaxInvitations;            // invite new devices |
| 2 | for(port=0; port<MaxPorts; port++) {      // for all ports... |
| 3 |    if ((addr[port] != NoDevice) \|\| (sendInvitation > 0)) { |
| 4 |       SendPoll(addr[port]);              // send polling message |
| 5 |       ReceiveResp(&a); // wait for a response |
| |                      // (a = NoDevice if no response received |
| 6 |       if (addr[port] == NoDevice) {        // port currently free |
| 7 |          if (a != NoDevice) {          // new device attached |
| 8 |             addr[port] = a;             // remember its address |
| 9 |             retries[port] = MaxRetries; |
| 10 |             status[port] = attached;       // notify host of change |
| 11 |          } else { // No response received |
| 12 |             // Decrement invitation count |
| 13 |             sendInvitation = sendInvitation − 1; |
| 14 |       } |
| 15 |    } else {                             // port in use |
| 16 |       if (a == addr[port])            // device still alive |
| 17 |          retries[port] = MaxRetries; |
| 18 |       else {     // Invalid response or no response from device |
| 19 |          if (retries[port] == 0)   {// retry threshold exceeded |
| 20 |             addr[port] = NoDevice;    // device detached |
| 21 |             status[port] = detached;// notify host of change |
| 22 |          }else { |
| 23 |             // Allow more attempts |
| 24 |             retries[port] = retries[port] − 1; |
| 25 |          } |
| 26 |       } |
| 27 |    } |
| 28 | } |

Figure 8:
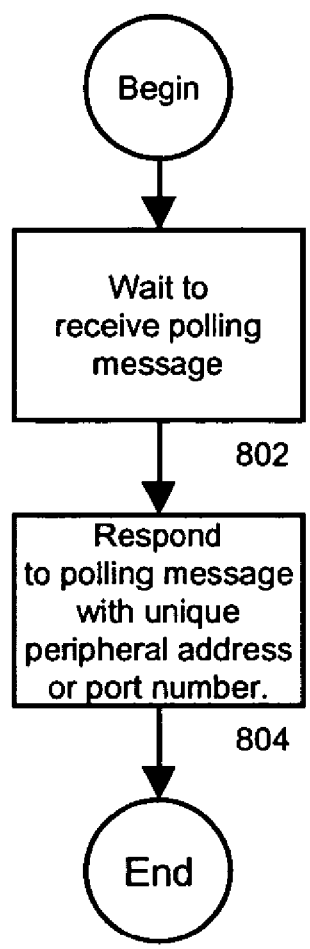
FIG. 8 is a flowchart of a peripheral method 800, to attach and detach wireless peripheral devices.

FIG. 8 depicts a flowchart of a peripheral method 800, an embodiment to attach and detach a wireless peripheral device 20 to a wireless host device 10 in a wireless system 100, constructed and operative in accordance with an embodiment of the present invention. Within peripheral method 800, wireless peripheral device 20 waits to receive a polling message, block 802. After a polling message is received, wireless peripheral device 20 responds to the polling message, block 804. Embodiments that use a unique peripheral address respond with their unique peripheral address; embodiments that do not use a unique peripheral address may respond with the received port number.

Figure 9:
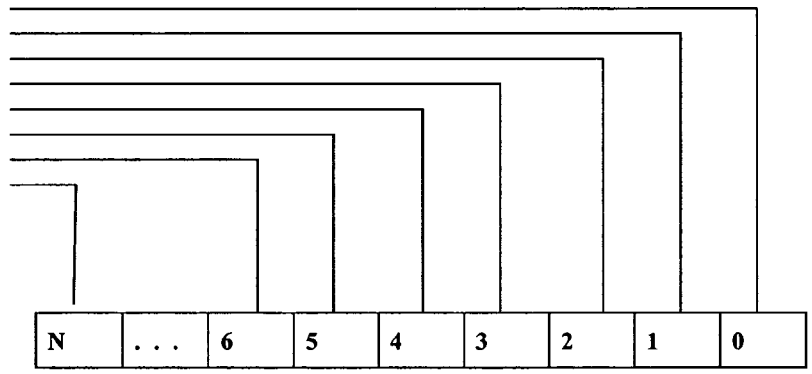
FIG. 9 depicts a hub status change register to attach and detach wireless peripheral devices.

FIG. 9 depicts a hub status register 900 to attach and detach wireless peripheral devices to a host in a wireless system, constructed and operative in accordance with an embodiment of the present invention. The host device 10 polls the hub status register 900 periodically, and performs the appropriate action according to USB specifications.

FIG. 10 depicts an example of a collision avoidance scheme to attach and detach wireless peripheral devices to a host in a wireless system, constructed and operative in accordance with an embodiment of the present invention. In the example diagram, two peripheral devices 20a and 20b attempt to respond to an invitation message by the host device 10. Assume that the peripheral device A (20a) randomly chooses to wait one time slot while peripheral device B (20b) chooses to wait four time slots before transmitting a response. In time slot one, peripheral device B senses that another peripheral device, peripheral device A, has started transmitting a response and accordingly backs off and waits for the next invitation message to arrive. Note that collisions can occur only when newly arriving devices try to connect to the wireless hub. Already attached devices are polled directly and do not need to compete for the channel. Consequently, there is no need to wait between the polling message from the host device 10 and the response from the attached peripheral device 20.

Figure 13A:
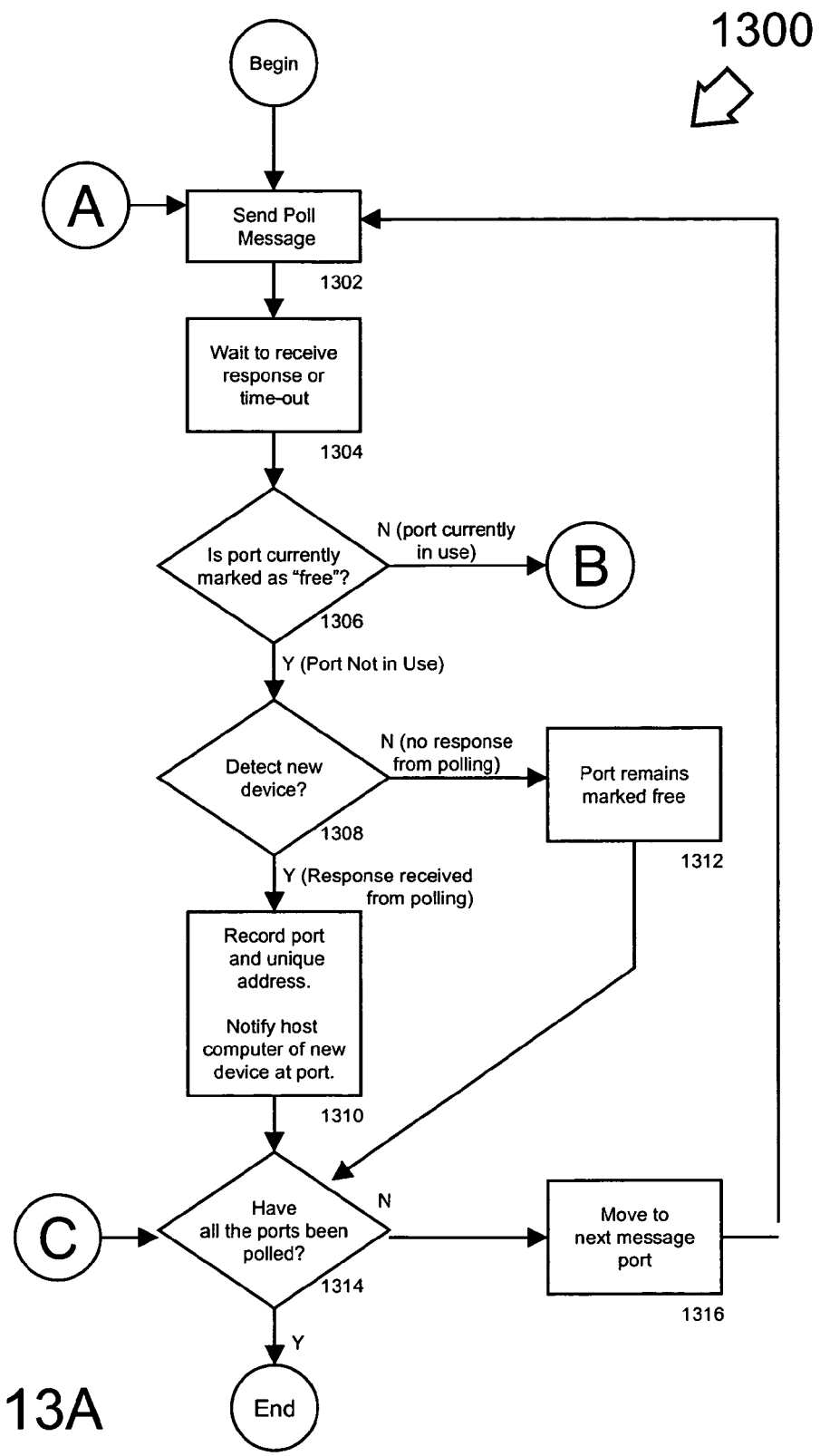
FIGS. 13A–13B are a flowchart of an alternate host method 1300, to attach and detach wireless peripheral devices to a host in a wireless system.
Figure 13B:
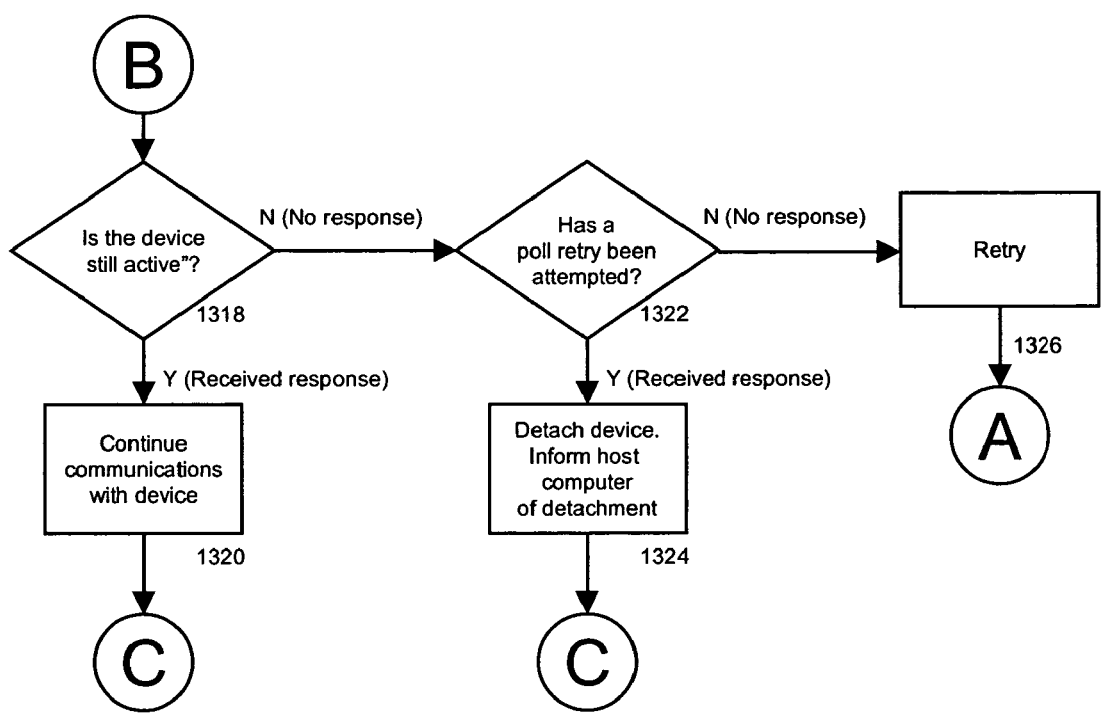

FIGS. 13A–13B are a flowchart of a host process 1300, an alternate embodiment to attach and detach a wireless peripheral device 20 to a wireless host device 10 in a wireless network 100, constructed and operative in accordance with an embodiment of the present invention.

To implement this "hot-plugging" feature for wireless USB, host process 1300 uses a polling scheme in which messages are passed over the wireless link, between the host device 10 and the peripheral device 20, in order to determine the state of each port supported by the host device 10. As in other embodiments, process 1300 retains the state of all downstream ports, the host maintains an internal data structure. The data structure may be any information structure known in the art capable of containing an entry for each port available to the host, including, but not limited to: arrays, linked lists, trees, or database schemas, and the like.

Initially, at block 1302, the wireless host device 10 sends a poll message through a port. If the port is marked as "free", the address field 1204 of the "poll" message is set to the "No Device" address; this is an invitation for new devices to join the network. Alternatively, if the port is marked as "in use", the address field 1204 of the "poll" message is set to the unique peripheral address. At block 1304, the host waits to receive a response or times out.

At decision block 1306, if the port is currently marked as "free" or "not in use," flow continues at block 1308. If the port is currently in use, flow continues at block 1318.

If there is no response from the polling, as determined by decision block 1308, the port remains marked as free, at block 1312. Alternatively, if a response is received at decision block 1308, flow continues at block 1310. Upon receiving this response, the host 15 marks that port 1208 as occupied by setting the address field 1204 to the received address, and by setting the retries field 1206 to the initial value. The host also sets the appropriate bit in the host status register 900 informing the host computer of the newly attached device. Flow continues at block 1314.

If all the ports have not yet been polled, as determined by block 1314, process 1300 continues to the next message port, block 1316, and flow returns to block 1302.

If all the ports have been polled, as determined by block 1314, process 1300 ends.

Continuing on FIG. 13B, if the "poll" message corresponds to an attached port, as determined at block 1306, the host then waits for a return response from the device for a specified amount of time. If the device is still within range and functioning as determined by block 1318, it responds with a "response" message, with the address field 1204 set to its unique peripheral address, which is the same address as specified in the "poll" message. The host continues communicating with the device at block 1320. The host records the port 1208 and unique peripheral address, and resets the retries field 1206 count to its initial value. If, within the timeout period, the host does not receive a response, at decision block 1322, it may mean that the device is no longer present (i.e. detached), or that an error occurred in either the transmission of the "poll" message, or the response message. In this case, if the retries field 1206 count is greater than 0, the host eventually reattempts to make contact at block 1326. The host decrements the retries field 1206 count by one and proceeds to the next port. Flow returns to block 1302.

If the retries field 1206 count equals 0, this signals to the host that the device is out of range (i.e. detached). The host detaches the device, informing the host computer of the detachment, block 1324. In some embodiments, the host resets the retries field 1206 count to the initial value, and sets the appropriate bit in a host status register, block 1324.

Due to the potential large number of ports, many of which may be unused, numerous unnecessary invitations could be sent by the host 15. The process 1300 may account for this situation by only transmitting additional invitations if there was a response to the previous invitation. In some embodiments, this may be implemented through maintaining an invitation flag indicating whether the last invitation was accepted. If not, then no more invitation messages (i.e. "poll" messages), with the address field 1204 set to "No Device," are sent during this polling period.

In the operation of some embodiments, invitations or responses to invitations are lost during transmission. The process 1300 may account for this by maintaining a count of invitation messages sent. If there is no response to the message, the count is decremented. If the count reaches zero, the host stops sending invitations. The count is reinitialized whenever a response is received.

Figure 14:
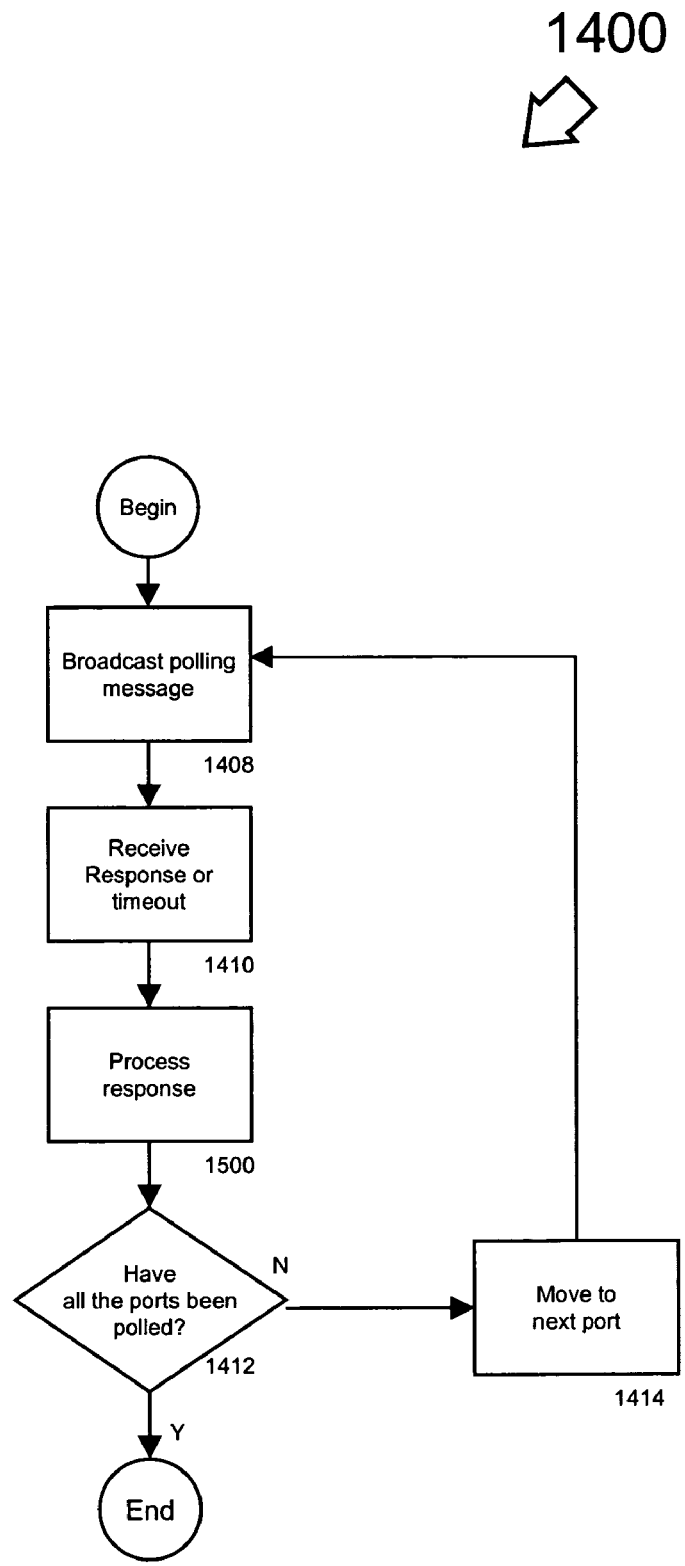
FIG. 14 is a flowchart of an alternate host method 1400, to attach and detach wireless peripheral devices to a host in a wireless system.
Figure 16A:
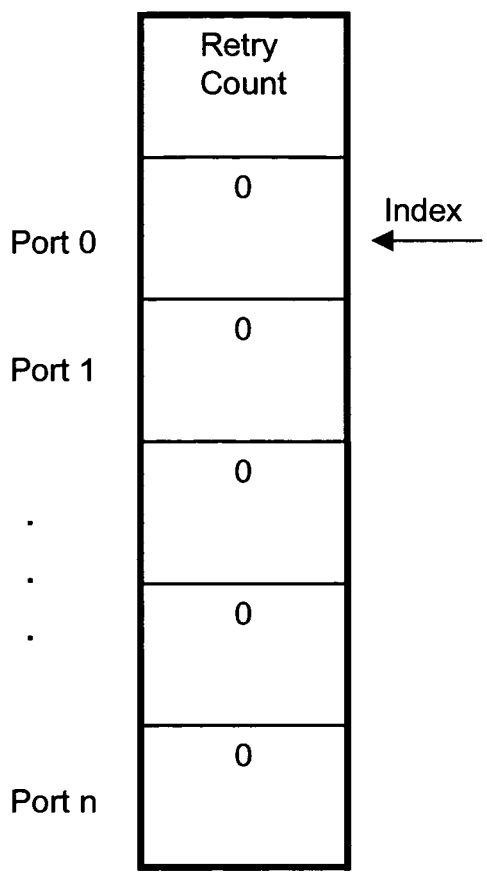
FIGS. 16A and 16B depict memory tables to track the attachment and detachment of wireless peripheral devices to a host in a wireless system.
Figure 16B:
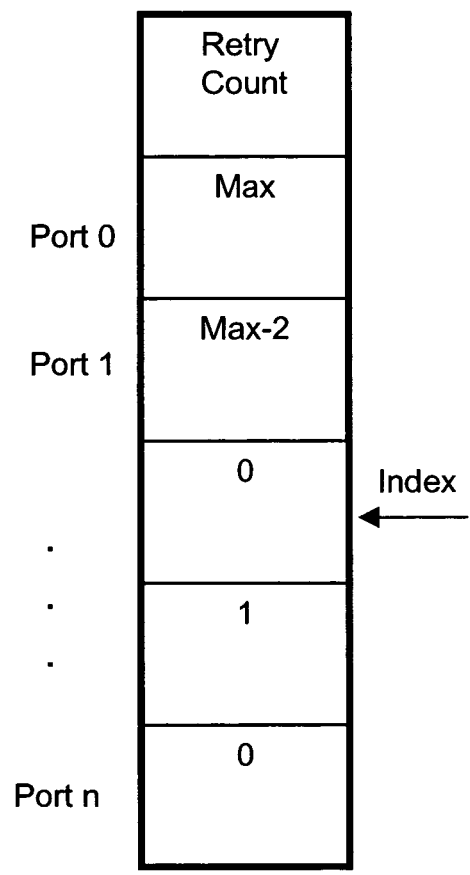

FIG. 14 illustrates a flowchart of a host polling period process 1400, another alternate embodiment to attach and detach a wireless peripheral device 20 to a wireless host device 10 in a wireless network 100, constructed and operative in accordance with an embodiment of the present invention. In this embodiment, neither a unique peripheral address nor a predetermined unique "No Device" address is required. Instead, the wireless host device 10 maintains a table along with an index into a table. The size of the table is equal to the number of available USB ports supported by the wireless host device 10, and therefore is indexed by port number. Examples of such a table are shown in FIGS. 16A and 16B, constructed and operative in accordance with an embodiment of the present invention. At each entry in the table, the wireless host device 10 stores a retry count for an associated port. A count of zero indicates that the port is available for new devices. At power-on, the retry count for each port is cleared indicating no devices are attached, as depicted in FIG. 16A.

During each polling period 1400, the wireless host device 10 in turn cycles through a number of entries in the table. At decision block 1402, a determination is made on whether a device is attached to the port.

For each entry in the table, a poll message is generated, block 1408. The contents of the request are the port number (i.e. the current index), and a status bit indicating the current state of the port. For retry counts of zero, the status bit is set to indicate that the port is available for new devices, otherwise it is set to indicate that the port is currently occupied. The wireless host device 10 then sends out the message and waits for a "Response" message or times out, block 1410. If a timeout occurs, it may mean that there are no new devices wishing to attach. In this case, the wireless host device 10 simply increments the index and continues.

Any device wishing to attach, listens for the "poll" message which corresponds to an unoccupied port. Upon receiving such a message, the device stores the port number and responds by issuing a "response" message with the same port number as specified in the "poll" message.

Figure 15:
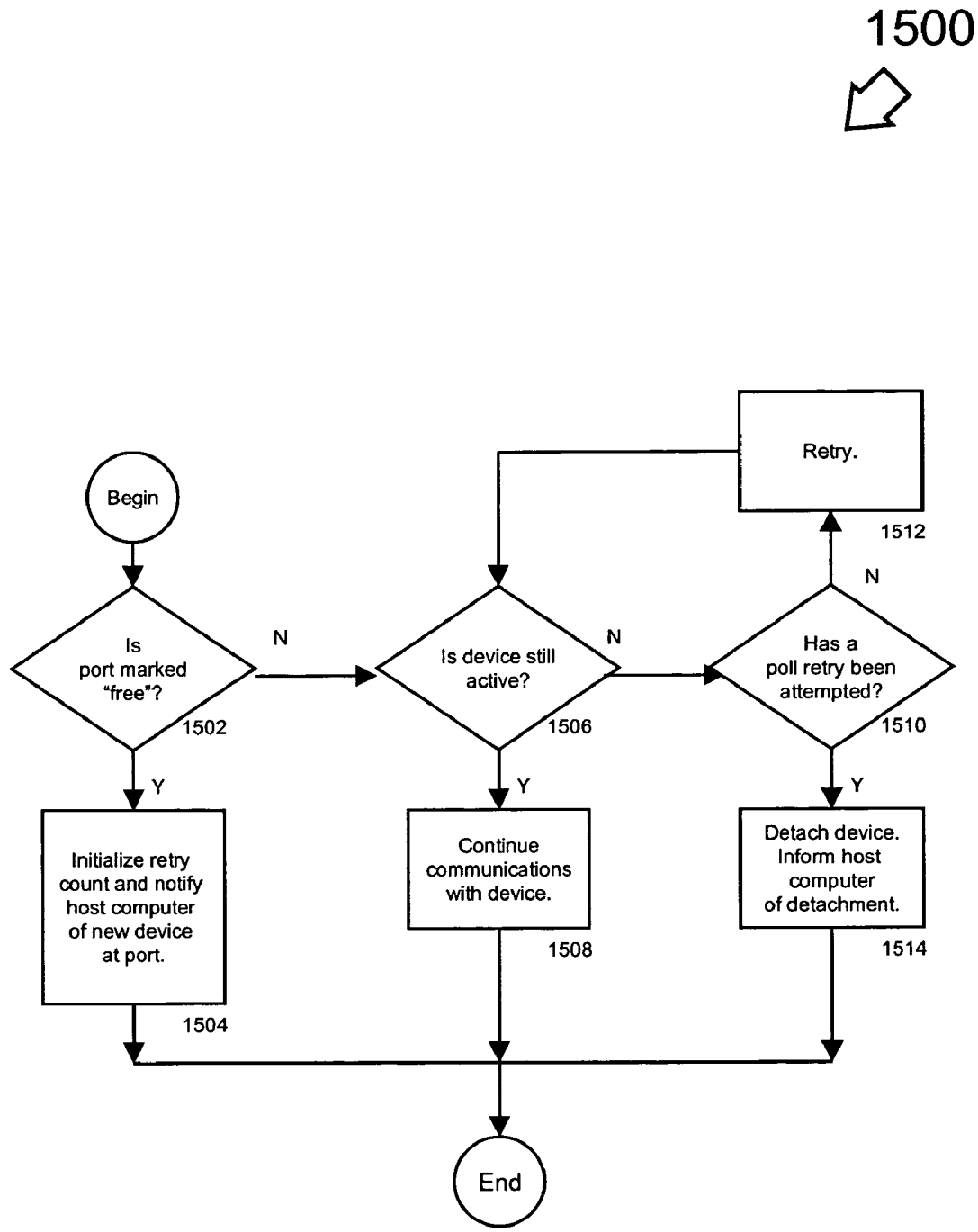
FIG. 15 is a flowchart of a process response method 1500, to attach and detach wireless peripheral devices to a host in a wireless system.

A response processing sub-task 1500 handles the "response" message, as illustrated in FIG. 15, constructed and operative in accordance with an embodiment of the present invention. A determination is made on whether the port is currently marked as free (i.e. "not occupied"), block 1502. The wireless host device 10, upon receiving the response, sets the retry count to a predefined non-zero number, for the port to indicate that the port is now occupied, block 1504. Sub-task 1500 notifies the host computer of the newly attached device, and increments the index at block 1504.

At decision block 1506, a determination is made on whether the device attached to the port is still active. If so, communications are continued with the device, block 1508. If the device is not active, sub-task 1500 detaches the device and informs the host computer, block 1514. Some embodiments may attempt to reestablish communication with the device, blocks 1510–1512, before detaching the device.

If all the ports have not yet been polled, as determined by block 1412, process 1400 continues to the next message port, block 1414, and flow returns to block 1402.

If all the ports have been polled, as determined by block 1412, process 1400 ends.

The following pseudo-code represents one possible implementation of process 1400 and sub-task 1500.

Alternate Embodiment Host Method Pseudo-Code

```
1.   sendInvitation = MaxInvitations;            // invite new devices
2.   for (port=0; port<MaxQueryPorts; port++)
3.       if ((retries[port] > 1) {
4.           request = AttachedRequest;          // device attached to port
5.       } else if (sendInvitation > 0)  {
6.           request = InviteRequest;            // invite new attachment
```

-continued

Alternate Embodiment Host Method Pseudo-Code

```
7.         } else continue;                        // else continue with next port
8.         SendPoll(port, request);                // send a polling message
9.         ReceiveResp(&resp);                     // wait for a response
10.        process_response(port, resp);           // process the response
11.    }
12.    // response processing task
13.    process_response(port, resp) {
14.        if (retries[port] == 0){                // port currently free
15.            if (resp == port) {                 // new device attached
16.                retries[port] = MaxRetries;     // remember its address
17.                status[port] = attached;        // notify host of change
18.            } else if (resp == NoResponse) {
19.                // Decrement invitation count
20.                sendInvitation = sendInvitation - 1;;
21.            }
22.        } else { // port in use
23.            if (resp == port) {                 // device still alive
24.                retries[port] = MaxRetries;
25.            } else { // Invalid response or no response from device
26.                if (retries[port] == 0)    {    // retry threshold exceeded
27.                    status[port] = detached;    // notify host of change
28.                } else { // allow more attempts
29.                    retries[port] = retries[port] - 1;
30.                }
31.            }
32.        }
33.    }
```

As described above, the embodiments of the present invention may include a single host and multiple peripheral devices. It is understood that in some embodiments other hosts and other peripheral devices may be collocated. Collocation may bring about interference concerns. Such concerns include garbled or lost communications, thereby impairing the ability of peripherals to attach to the host, or causing the host to perform unwanted detachments of peripherals. Several techniques that provide channelization solutions, as is known in the art, include Time Division Multiple Access (TDMA), Carrier Sensing Multiple Access (CSMA), and CDMA (Code Division Multiple Access).

It is further understood that in such embodiments, collocation of multiple hosts and devices provides enables the sharing of devices between hosts. There are numerous approaches that permit device sharing. For example, mechanical devices such as knobs and buttons may allow manual channel selection for hosts and peripherals. Alternatively, host software may provide a user interface allowing peripheral devices to select a desired host. Additionally, dynamic channel selection may be implemented using ranging techniques as is known in the art.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. A host apparatus comprising:

a device interface configured to couple to a computing device;

a downstream port configured to receive a response from a wireless peripheral device;

a control layer coupled to the device interface and coupled to the downstream port, the control layer configured to initiate polling of the downstream port to determine a state of the downstream port; and a computer readable memory configured to store updated port information with the state of the downstream port from the control layer.

2. The apparatus of claim 1, farther comprising:

a status register configured to store a state of the downstream port.

3. The apparatus of claim 2, wherein the control layer is further configured to poll the downstream port by sending a polling message, the polling message comprising a message header identifier.

4. The Apparatus of claim 3, wherein the control layer is further configured to re-poll the downstream port when the response is not received from the wireless peripheral device on the downstream port.

5. The apparatus of claim 4 wherein the control layer is further configured to poll the downstream port until a retry count is exhausted or the response is received.

6. The apparatus of claim 5 wherein the control layer is further configured to signal detachment of the wireless peripheral on the downstream port when the retry count is exhausted.

7. The apparatus of claim 6 wherein the control layer is further configured to mark the status register to indicate if any new wireless peripheral devices have attached.

8. The apparatus of claim 7, the control layer further comprising:

a protocol management interface configured to interface with the device interface using Universal Serial Bus protocol.

9. A method of attaching wireless peripheral devices to a wireless host device, the method comprising:

initiating, at a control lever of the wireless host device polling of a downstream port by sending a polling message to the downstream port, the wireless host device also including a device interface coupled to a computing device;

receiving a response from a wireless peripheral device on the downstream port;

determining the state of the downstream port based on the response;

updating port information with the state of the downstream port; and updating a status register regarding the state of the downstream port.

10. The method of claim 9 wherein the polling message comprises a message header identifier.

11. The method of claim 10 further comprising:
re-polling the downstream port when a response is not received from the wireless peripheral device on the downstream port.

12. The method of claim 11 wherein the re-polling is done until a retry count is exhausted.

13. The method of claim 12 further comprising:
signaling detachment of the wireless peripheral on the downstream port when the retry count is exhausted.

14. The method of claim 13 further comprising:
marking the status register to indicate if any new wireless peripheral devices have attached.

15. A computer-readable medium encoded with data and instructions, the data and instructions causing an apparatus executing the instructions to:
initiate, at a control layer of a wireless host device, polling of a downstream port by sending a polling message to the downstream port, the wireless host device also including a device interface coupled to a computing device;
receive a response from a wireless peripheral device on the downstream port;
determine the state of the downstream port based on the response;
update port information with the state of the downstream port; and
update a status register regarding the state of the downstream port.

16. The computer-readable medium of claim 15 wherein the initialing the polling of the downstream port is accomplished by sending the polling message, the polling message comprising a message header identifier.

17. The computer-readable medium of claim 16, the instructions further causing an apparatus executing the instructions to:
re-poll the downstream port when a response is not received from the wireless peripheral device on the downstream port.

18. The computer-readable medium of claim 17 wherein the re-polling is done until a retry count is exhausted.

19. The computer-readable medium of claim 18, the instructions further causing an apparatus executing the instructions to:
signal detachment of the wireless peripheral on the downstream port when the retry count is exhausted.

20. The computer-readable medium of claim 19, the instructions further causing an apparatus executing the instructions to:
mark the stats register to indicate if any new wireless peripheral devices have attached.

21. An apparatus comprising:
means for initiating, at a control layer of a wireless host device, polling of a downstream port by sending a polling message to the downstream port, the wireless host device also including a device interface coupled to a computing device;
means for receiving a response from a wireless peripheral device on the downstream port;
means for determining the state of the downstream port based on the response;
means for updating port information with the state of the downstream port; and
means for updating a status register regarding the state of the downstream port.

22. The apparatus of claim 21 wherein the means for initiating the polling of the downstream port is configured to send the polling message, the polling message comprising a message header identifier.

23. The apparatus of claim 22 further comprising:
means for re-polling the downstream port when a response is not received from the wireless peripheral device on the downstream port.

24. The apparatus of claim 23 wherein the downstream port is re-polled until a retry count is exhausted.

25. The apparatus of claim 24 further comprising:
means for signaling detachment of the wireless peripheral on the downstream port when the retry count is exhausted.

26. The apparatus of claim 25 further comprising:
means for marking a status register to indicate if any new wireless peripheral devices have attached.

* * * * *

UNITED STATES PATENT AND TRADEMARK OFFICE
CERTIFICATE OF CORRECTION

PATENT NO.         : 7,149,834 B2                                          Page 1 of 1
APPLICATION NO. : 11/100763
DATED              : December 12, 2006
INVENTOR(S)        : Peters et al.

It is certified that error appears in the above-identified patent and that said Letters Patent is hereby corrected as shown below:

On Title Page Item [57]

Abstract, Line 4; the word "devices," should be replaced with the word -- devices. --.

Claim 2, Column 12, Line 37; the word "farther" should be replaced with the word -- further --.

Claim 9, Column 12, Line 66; the word "lever" should be replaced with the word -- layer --.

Claim 9, Column 12, Line 66; after the word "device" insert -- , --.

Claim 16, Column 13, Line 43; the word "initialing" should be replaced with the word -- initiating --.

Claim 20, Column 14, Line 14; the word "stats" should be replaced with the word -- status --.

Signed and Sealed this

Twentieth Day of March, 2007

JON W. DUDAS
*Director of the United States Patent and Trademark Office*